Patented July 27, 1943

2,325,202

UNITED STATES PATENT OFFICE 2,325,202

AGE RESISTOR FOR RUBBER

Albert M. Clifford, Stow, Ohio, assignor to Wingfoot Corporation, Akron, Ohio, a corporation of Delaware No Drawing. Application July 18, 1940,
Serial No. 346,188

5 Claims. (Cl. 260—809)

This invention relates to the treatment of rubber and more particularly to the use in rubber of age resistors formed by reacting a di(arylamino) methane and a diaryl amine in the presence of an acid.

Many compounds are known which, when incorporated into rubber, will prevent or retard natural deterioration of the rubber due to the effects of oxygen, light, flexing, heat, etc. According to the present invention, a new class of age resistors for rubber has been discovered, the compounds of which are highly effective for retarding such deterioration.

If a primary aryl amine is reacted with formaldehyde, a number of products are possible, depending upon the molecular proportions of the reactants, the temperature, presence of acids, etc. If one mol of formaldehyde is treated with two mols of a primary aryl amine under such conditions as to effect a condensation, with attendant splitting out of water, the predominant reaction involves a linkage of two molecules of the amine through a methylene group according to the following equation:

(1) $2R\text{---}NH_2 + HCHO \rightarrow$
$R\text{---}NH\text{---}CH_2\text{---}NH\text{---}R + H_2O$ These aldehyde-amine derivatives may be called di(arylamino) methanes. The simplest material of this type is methylene dianilid, which has the structural formula

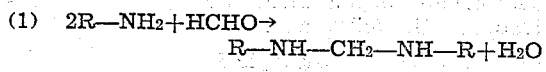

and is obtained by reacting two mols of aniline with one mol of formaldehyde according to the process represented by Equation 1.

The age resistors of the present invention are prepared by reacting such di(arylamino) methanes with a diaryl amine in the presence of a strong inorganic acid, such as hydrochloric acid. The products of this reaction are generally non-crystalline, indefinite mixtures but there is good reason to believe that the principal reaction involves a splitting of the di(arylamino) methane, accompanied by nuclear substitution of the diaryl amine. This type of reaction may be demonstrated by the following equation, in which methylene dianilid, phenyl-beta-naphthylamine and hydrochloric acid are employed as representative materials:

(2) $C_6H_5NH\text{---}CH_2\text{---}NH\text{---}C_6H_5 + C_6H_5\text{---}NH\text{---}$ 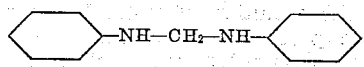 $+ HCl \rightarrow$

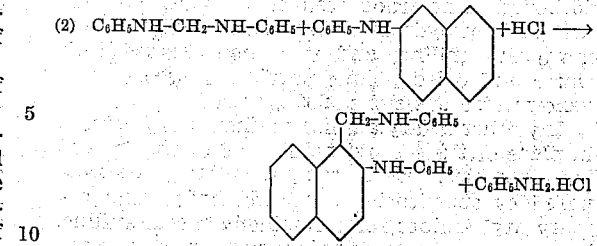 $+ C_6H_5NH_2 \cdot HCl$

The preparation of the age resistors of the invention is illustrated by the following examples.

Example 1

One mol of methylene dianilid was prepared by mixing 186 grams (2 mols) of aniline and 81 grams (1 mol) of 40% formaldehyde and allowing the mixture to remain warm for 1½ hours. Two hundred nineteen grams (1 mol) of phenyl-beta-naphthylamine were then added with stirring and the mixture was warmed until complete solution was effected. Eighty-three cc. (1 mol) of concentrated hydrochloric acid (sp. gr. 1.18) were then added gradually and the mixture was stirred and heated at 90–100° C. for 19 hours. The reaction product was then made alkaline with sodium hydroxide to liberate the aniline from the aniline hydrochloride formed in the reaction and was then subjected to steam distillation until all of the aniline had been removed. The residue was then washed with water and dried and when so purified weighed 324 grams, which was equivalent to the theoretical yield.

Example 2

One-half mol of methylene dianilid was prepared as in Example 1. One hundred thirty grams (½ mol) of diphenyl-para-phenylene diamine and 41½ cc. (½ mol) of concentrated hydrochloric acid were added and the mixture was stirred and warmed at 80–95° C. for 20 hours. The crude product was made alkaline with sodium hydroxide and the aniline was removed by steam distillation. The residue was then washed several times with water and dried. The product weighed 193½ grams.

Example 3

Ninety-three grams (1 mol) of aniline and 40½ grams (½ mol) of 40% formaldehyde were mixed and allowed to react for 15 minutes. Ninety grams (½ mol) of mixed N-phenyl-N-tolyl amines, prepared by the condensation of aniline and mixed with cresols, were stirred in, the mixture was warmed for a short time, and then 41½ cc. (½ mol) of concentrated hydrochloric acid were added gradually. The mixture was heated with occasional stirring at 92–94° C. for 19 hours. The crude product was made alkaline with sodium hydroxide and subjected to steam distillation until free from aniline. The residue was then washed with water and dried and when so purified weighed 145 grams.

*Example 4*

One-half mol of methylene dianilid was prepared as in Example 1 and, to this, 124½ grams of beta-naphtho-phenothiazine (½ mol) were added as a fine powder. The mixture was stirred and heated to 70–90° C. for about 3 hours to produce a homogeneous solution and then 41½ cc. (½ mol) of concentrated hydrochloric acid were added slowly, keeping the temperature below 90° C. by cooling. The reaction mixture was then heated, with occasional stirring, at 92–94° C. for 20 hours. The crude product was made alkaline with sodium hydroxide, was steam distilled to remove the aniline, and was then washed with water and dried. Thus purified, it was a dark yellow wax and weighed 200 grams.

Any other di(arylamino) methane may be used in place of the methylene dianilid of the foregoing examples. Such compounds may be prepared by substituting other aldehydes and primary aryl amines for formaldehyde and aniline. For example, acetaldehyde may be used in place of formaldehyde. The primary arylamines employed, in the case of phenyl amines, should preferably have a "free" position para to the amino group but, except for this limitation, almost any primary arylamine will produce a di(arylamino) methane. Suitable amines include, in addition to aniline, alpha-naphthylamine, beta-naphthylamine and the like, and mixtures thereof. In addition, these aryl amines may contain various neutral or basic substituents such as alkyl, aryl, aralkyl, alkoxy, aryloxy, amino and hydroxyl groups, which are inert in the further reaction of the di(arylamino) methanes to produce the desired age resistors and which do not exert any detrimental effect on the action of the age resistors in rubber. Substituted di(arylamino) methanes containing such substituents are, for the purposes of the present invention, full equivalents of the di(arylamino) methanes and are intended to be covered by the claims.

Such di(arylamino) methanes are reacted with a diarylamine in the presence of a strong inorganic acid, such as hydrochloric acid. Hydrobromic acid may also be used but it has the disadvantage of being more expensive than hydrochloric acid. Sulfuric acid has the disadvantage that it causes sulfonation of the aryl rings. Thus, although other strong inorganic acids may be used, hydrochloric acid is preferred. Any diarylamine may be employed. In addition to the strictly diarylamines in which the aryl groups are hydrocarbon, amines containing various neutral or basic substituent groups such as alkyl, aryl, aralkyl, alkoxy, aryloxy, amino and hydroxyl groups may also be employed since, as noted above, such groups are substantially inert and do not adversely affect the age resistors formed. Such substituted amines are, for the purposes of the present invention, full equivalents of the diarylamines and are intended to be covered by the claims. In addition, cyclic secondary amines, such as the thiazines and oxazines may be employed. The use of such materials is illustrated in Example 4. In the case of phenyl-amines, the tendency is for the nuclear substitution to take place para to the amino group. In the case of alpha-naphthylamines and beta-naphthylamines, the tendency is for the substitution to take place in the beta and alpha positions, respectively. These effects may be dependent upon lability of the hydrogens, or steric hindrance; in any event, they are well-known among organic chemists. In view of these effects, it is desirable to have at least one such position "free," i. e., containing hydrogen rather than a substituent radical.

The di(arylamino) methane, the diarylamine and the acid may be used in a wide range of proportions while still obtaining the desired age resistors. The three components may react in substantially equimolecular proportions, as shown in Equation 2. Also, it is possible for nuclear substitution to take place on each of the aryl groups of the diarylamine. In such case, more than one mol of di(arylamino) methane may be employed for each mol of diarylamine and the acid should be increased to an amount equivalent to the di(arylamino) methane. When either of the reactants is in excess of the amount of material which will react, the excess merely carries through to the product as an impurity which can be removed if desired. In some cases such removal is not necessary and the impure product can be used directly as an age resistor.

Any temperature which will effect splitting of the di(arylamino) methane and nuclear substitution of the diarylamine may be employed. Suitable temperatures are approximately 65° C. to 100° C. The pressure is not critical and atmospheric pressure is convenient and satisfactory.

The age resistors of the invention, when employed with mercaptothiazole type accelerators, exert a slight activating influence on these accelerators so that the amount of accelerator ordinarily employed can be somewhat reduced. If it is desired to lessen this activating influence, the age resistors of the invention may be further reacted with a phenolic compound as illustrated by the following example.

*Example 5*

One hundred five grams of the product of Example 2 and 40 grams of beta-naphthol were heated in the presence of one gram of iodine at a temperature of 200–230° C. At the end of 8 hours the evolution of water had ceased and the crude product thus obtained was washed with dilute sodium hydroxide followed by washing with water and then with hydrochloric acid and was finally steam distilled. Thus purified, it weighed 125 grams.

The age resistors of the invention were tested by incorporating them into rubber in accordance with the following formula, vulcanizing the stocks and subjecting samples of the cured stocks to physical tests both before and after ageing in an oxygen bomb for six days at 50° C. and under 150 pounds oxygen pressure.

| | Parts by weight |
|---|---|
| Extracted pale crepe | 100.0 |
| Zinc oxide | 5.0 |
| Sulfur | 3.0 |
| Hexamethylene tetramine | 1.0 |
| Stearic acid | 1.5 |
| Antioxidant | 1.0 |

The following test data were obtained using the products of Examples 1-5.

| Cure in min.°/F. | Before ageing | | | | After ageing | | | | Per cent wt. inc. | Tens. ratio, per cent |
|---|---|---|---|---|---|---|---|---|---|---|
| | Tens. in kgs./cm.² | Elg. in per cent | Mod., kgs./cm.² | | Tens. in kgs./cm.² | Elg. in per cent | Mod., kg./cm.² | | | |
| | | | 500% | 700% | | | 500% | 700% | | |
| 35/285 | 136 | 830 | 19 | 63 | 140 | 750 | 27 | 104 | .11 | |
| 50 | 165 | 785 | 26 | 99 | 162 | 720 | 37 | 149 | .43 | 100 |
| 70 | 166 | 725 | 36 | 141 | 164 | 685 | 46 | ----- | .44 | |
| 35/285 | 142 | 815 | 21 | 73 | 123 | 760 | 24 | 94 | ----- | |
| 50 | 132 | 675 | 46 | ----- | 148 | 700 | 42 | 148 | ----- | 103 |
| 70 | 159 | 730 | 36 | 135 | 165 | 695 | 55 | ----- | .01 | |
| 35/285 | 96 | 860 | 14 | 39 | 111 | 800 | 18 | 60 | ----- | |
| 50 | 140 | 860 | 18 | 55 | 140 | 780 | 25 | 89 | ----- | 110 |
| 70 | 148 | 800 | 24 | 81 | 172 | 760 | 32 | 122 | .01 | |
| 35/285 | 120 | 765 | 23 | 80 | 113 | 700 | 30 | 113 | ----- | |
| 50 | 143 | 730 | 31 | 120 | 130 | 675 | 38 | ----- | .09 | 86 |
| 70 | 182 | 710 | 42 | 170 | 140 | 650 | 52 | ----- | .16 | |
| 35/285 | 110 | 750 | 23 | 81 | 112 | 710 | 29 | 107 | .03 | |
| 50 | 152 | 750 | 30 | 115 | 128 | 675 | 37 | ----- | .06 | 90 |
| 70 | 180 | 710 | 42 | 170 | 160 | 660 | 50 | ----- | .14 | |

The action of the age resistors in imparting good flex life to rubber was tested in a stock of the following composition:

| | Parts by weight |
|---|---|
| Smoked sheet | 100.0 |
| Zinc oxide | 5.50 |
| Carbon black | 43.00 |
| Sulfur | 2.75 |
| Stearic acid | 4.00 |
| Pine tar | 5.70 |
| Mercaptobenzothiazole | As indicated |
| Antioxidant | 1.00 |

Because of the activating effect of the age resistors, the amount of mercaptobenzothiazole employed in each case was adjusted to give the best cure in 70 minutes at 260° F. The results obtained on stocks cured for 70 and 140 minutes respectively at 260° F. expressed in percentage of the flex life of a control in which the age resistor was phenyl beta naphthylamine were as follows:

| Product of Example— | Parts of mercapto-benzothiazole | 70' | 140' at 260° |
|---|---|---|---|
| 1 | 0.75 | 101 | 95 |
| 2 | 0.75 | 117 | 118 |
| 3 | 0.50 | 95 | 120 |
| 4 | 0.50 | 91 | 110 |
| 5 | 1.35 | 92 | 70 |

What I claim is:

1. The method of treating rubber which comprises vulcanizing it in the presence of the product obtained by reacting, at a temperature of about 65 to 100° C., a di(arylamino) methane and a diarylamine in the presence of hydrochloric acid.

2. The method of treating rubber which comprises vulcanizing it in the presence of the product obtained by reacting, at a temperature of about 65–100° C., a di(arylamino) methane and a diarylamine in the presence of a strong inorganic acid.

3. The method of treating rubber which comprises vulcanizing it in the presence of the product obtained by reacting, at a temperature of about 65–100° C., methylene dianilid and a diarylamine in the presence of hydrochloric acid.

4. The method of treating rubber which comprises vulcanizing it in the presence of the product obtained by reacting, at a temperature of about 65–100° C., methylene dianilid and phenyl beta naphthylamine in the presence of hydrochloric acid.

5. The method of treating rubber which comprises vulcanizing it in the presence of the product obtained by reacting, at a temperature of about 65–100° C., methylene dianilid and diphenyl-p-phenylene diamine in the presence of hydrochloric acid.

ALBERT M. CLIFFORD.